Figure 6:
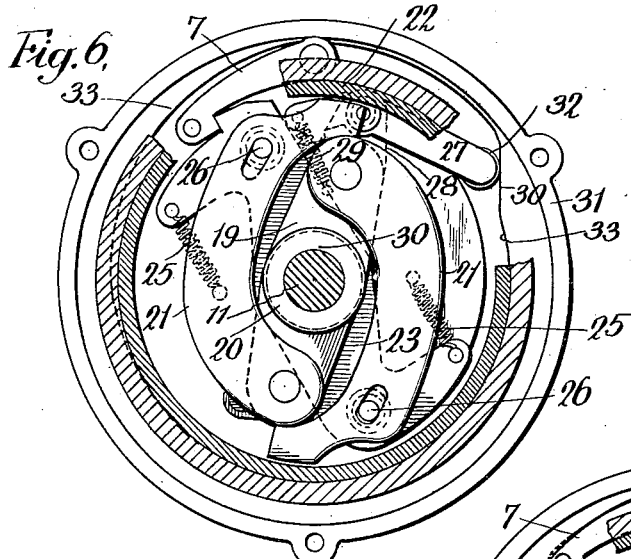

A. KNISTROM.
CLUTCH FOR POWER DRIVEN CALCULATING MACHINES.
APPLICATION FILED JUNE 11, 1908.
999,659.
Patented Aug. 1, 1911.
5 SHEETS—SHEET 1.
Fig. 1,
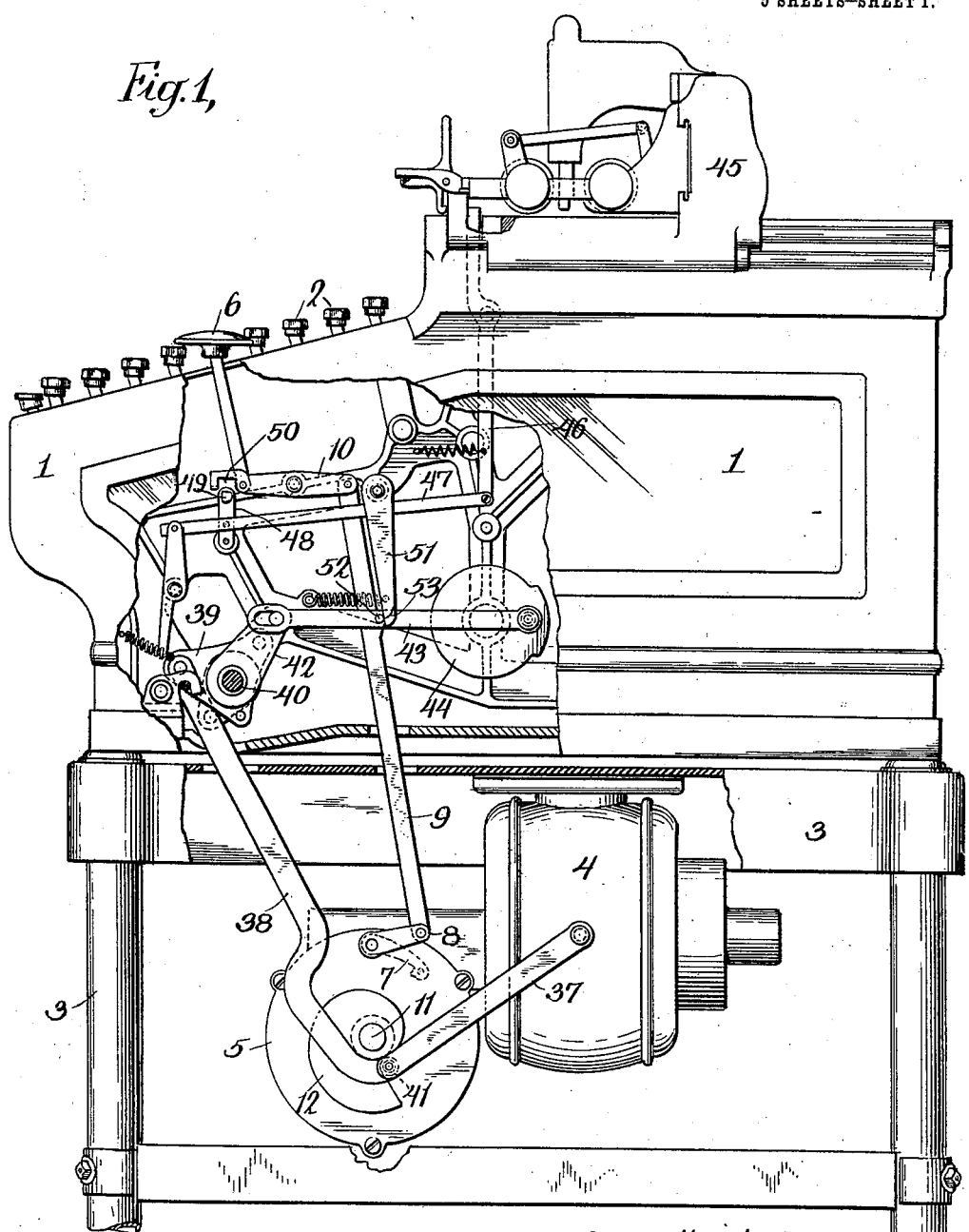
WITNESSES:
*August Knistrom* INVENTOR
BY
ATTORNEYS A. KNISTROM.
CLUTCH FOR POWER DRIVEN CALCULATING MACHINES.
APPLICATION FILED JUNE 11, 1908.
999,659.
Patented Aug. 1, 1911.
5 SHEETS—SHEET 2.
Fig. 2,
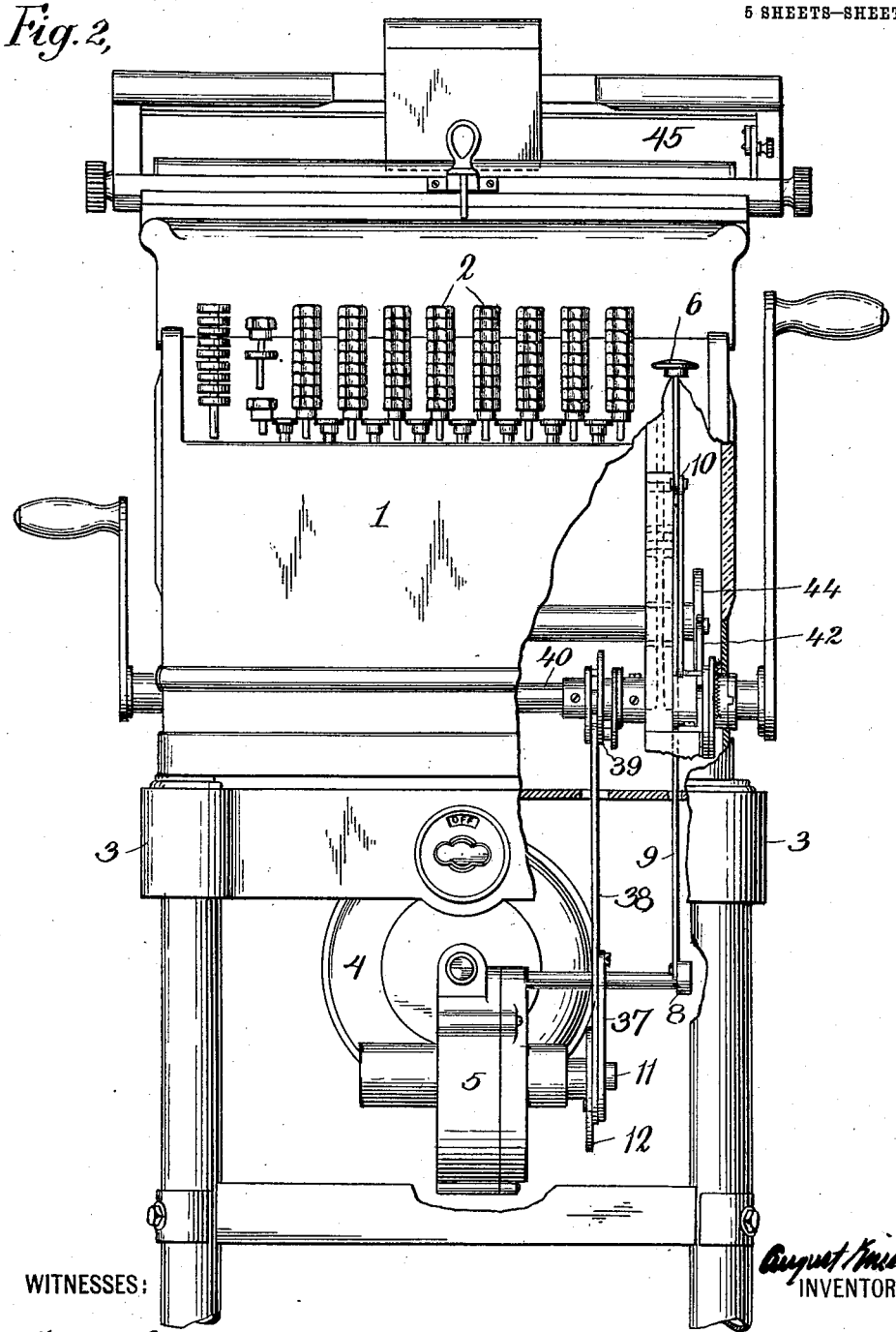
WITNESSES:
INVENTOR
BY
ATTORNEYS A. KNISTROM.
CLUTCH FOR POWER DRIVEN CALCULATING MACHINES.
APPLICATION FILED JUNE 11, 1908.
999,659.
Patented Aug. 1, 1911.
5 SHEETS—SHEET 3.
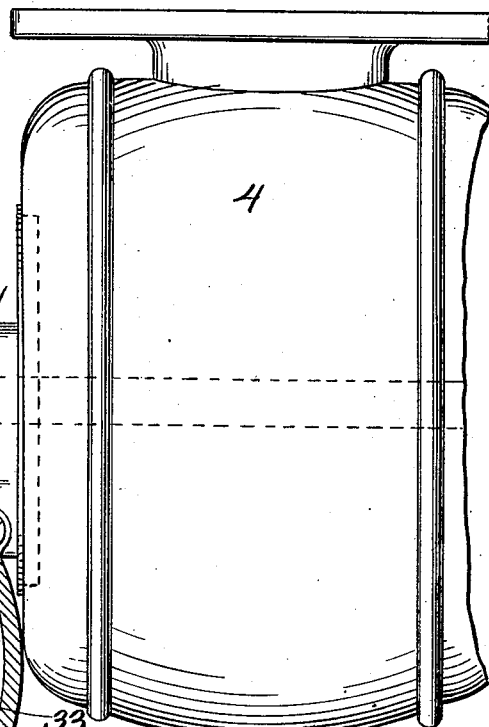
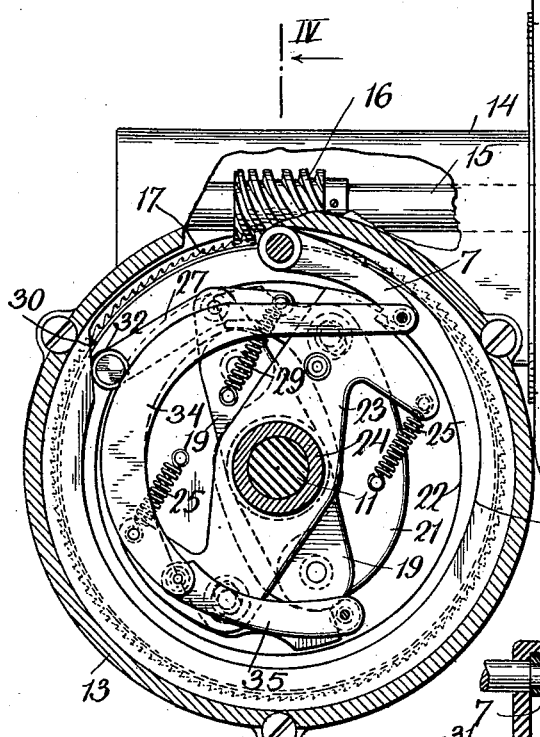
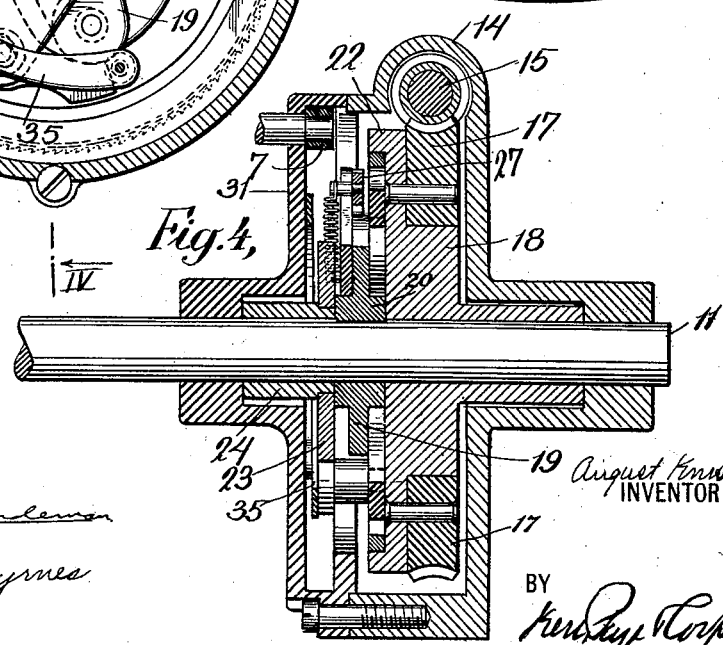
WITNESSES:
August Knistrom
INVENTOR
BY
ATTORNEYS

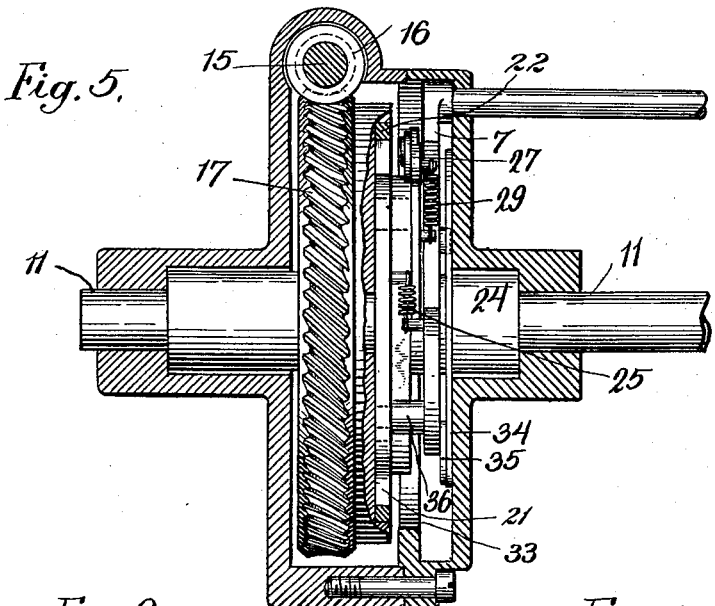
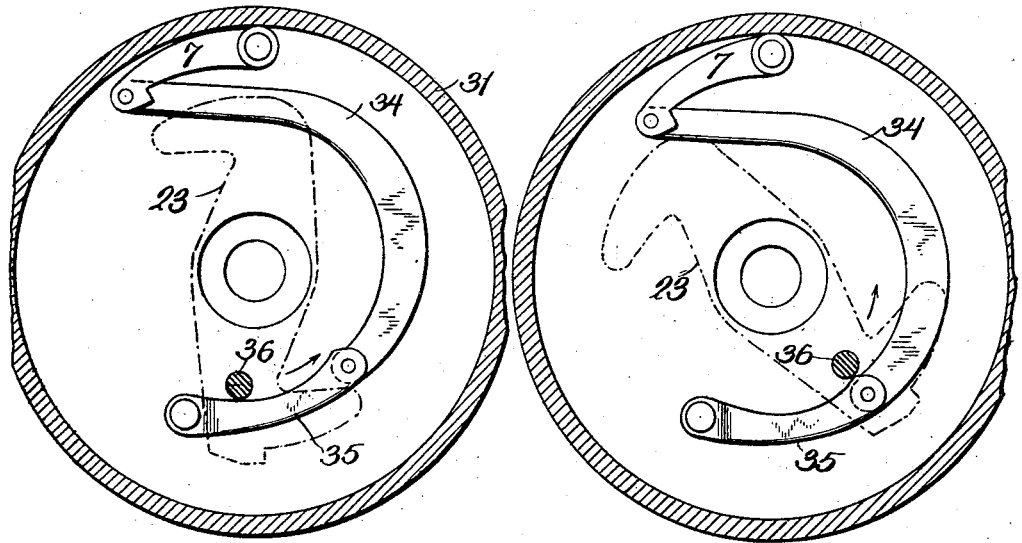

A. KNISTROM.
CLUTCH FOR POWER DRIVEN CALCULATING MACHINES.
APPLICATION FILED JUNE 11, 1908.

999,659.

Patented Aug. 1, 1911

5 SHEETS—SHEET 5.

WITNESSES

August Knistrom
INVENTOR

BY
ATTORNEYS

UNITED STATES PATENT OFFICE.

AUGUST KNISTROM, OF BINGHAMTON, NEW YORK, ASSIGNOR TO BUNDY MANUFACTURING COMPANY, OF ENDICOTT, NEW YORK, A CORPORATION OF NEW YORK.

CLUTCH FOR POWER-DRIVEN CALCULATING-MACHINES.

999,659. Specification of Letters Patent. Patented Aug. 1, 1911.

Application filed June 11, 1908. Serial No. 437,866.

*To all whom it may concern:*

Be it known that I, AUGUST KNISTROM, a subject of the King of Sweden, residing at Binghamton, in the county of Broome and State of New York, have invented certain new and useful Improvements in Clutches for Power-Driven Calculating-Machines, of which the following is a specification, reference being had to the drawings accompanying and forming part of the same.

This invention relates to calculating machines. In machines of this kind the mechanism, by which the various operations referred to are performed, is usually actuated by a movement of a manual lever after each item is set up to effect the printing of the same, and another lever which is similarly actuated after all the items have been set up to effect the desired calculation and print the result. It is found, however, that the actuation of the mechanism by manual means requires an appreciable amount of time in every operation, so that in the course of a day's use of the machine the total time expended in these manual operations is a very considerable amount.

I have accordingly been led to devise my present invention, which has for its chief object to provide an apparatus in which the power of the motor shall be applied instantly upon the mere release or actuation of a controlling button or equivalent device by the operator and shall be automatically cut off at the conclusion of each cycle of operation.

A further object is to provide means for the purpose which shall be of the simplest character while at the same time thoroughly effective and reliable.

In carrying out my invention in the preferred manner I provide a motor, preferably electric, which is arranged to run continuously while the machine is in use. Between the motor shaft and the power shaft of the machine I provide a clutch of novel construction, with means controlled by the operator for throwing the clutch into action at will. The clutch also includes mechanism whereby it is automatically thrown out of action practically instantaneously at the end of the cycle of operations for which the motor furnishes the power. Thus the only act to be performed by the operator besides setting up the items is to throw the clutch into action, effected in the preferred embodiment by a slight pressure on a plunger conveniently located. The printing, adding, or other operation is then instantly done by the machine, driven by the motor, by the time the operator has noted the next item which is to be set up, so that no delay whatever is occasioned by the mechanical operations. The work which can be turned out in a given time is thus limited only by the skill of the operator in setting up the separate amounts or items.

The embodiment thus briefly outlined is illustrated in the annexed drawings, in which—

Figure 7:
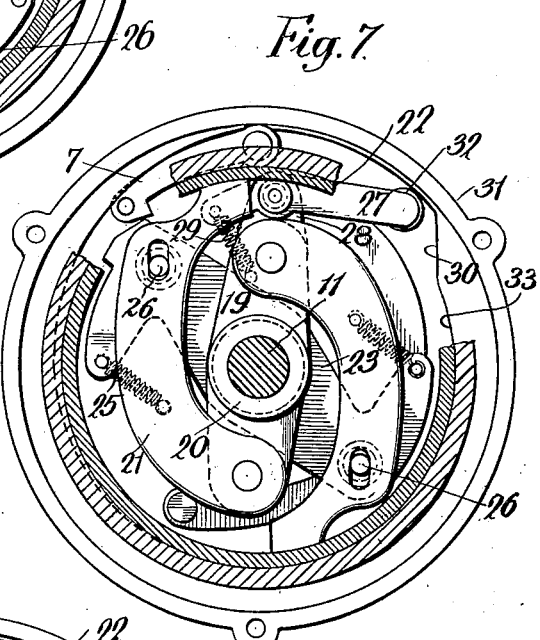
Figure 8:
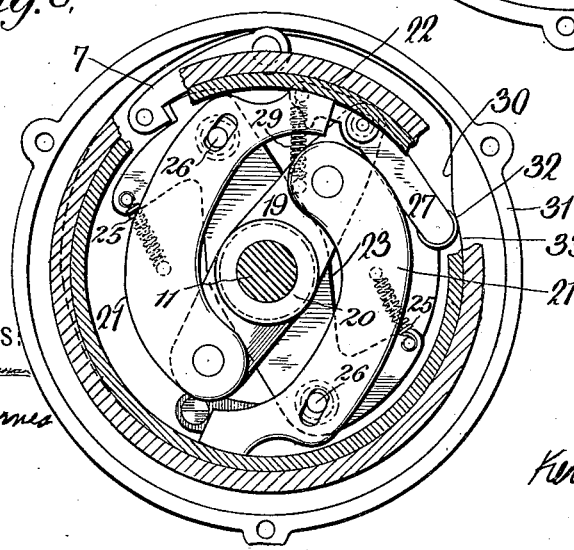

Figure 1 is a side elevation of the complete calculating machine, motor, and clutch, with a portion of the casing of the first broken away to show the mechanism by which the clutch is controlled. Fig. 2 is a front view of the same. Fig. 3 is a detail side view, of the motor and clutch, showing the mechanism of the latter. Fig. 4 is a section on line IV—IV of Fig. 3, looking in the direction of the arrows. Fig. 5 is a front view of the clutch mechanism, with the inclosing casing in cross-section. Fig. 6 is a side view of the clutch mechanism, looking in the opposite direction to Fig. 3, showing the mechanism locked in inoperative position. Fig. 7 is a view similar to Fig. 6 but showing the clutch unlocked and at the beginning of its operation. Fig. 8 is a view similar to Fig. 7 but showing the mechanism near the conclusion of its operation, just before the automatic disengagement of the clutch mechanism, and the relocking of the parts, occur. Figs. 9 and 10 are detail views showing, in different positions, the mechanism for restoring the locking device or stop to its normal position.

Referring now to the drawings (Figs. 1 and 2) for a more complete description of the preferred form of the invention, 1 designates the outer casing of the calculating machine, and 2 the finger-keys by which the operator sets up the items entering into the computations to be performed by the machine. The apparatus is mounted on an open frame or stand 3, and suspended below the apparatus from the bottom of the same is the motor 4, which furnishes the power for the various printing and calculating operations. 5 indicates the clutch by which the motor is operatively connected to the machine, and 6 is the key or plunger arranged near the item or setting-up keys, which is depressed by the operator when he desires to throw the clutch into action. The clutch mechanism is normally held in inoperative position by a hook or stop 7, shown in dotted lines in Fig. 1. This stop is connected by an arm 8, link 9, and lever 10 to the clutch-controlling key 6, so that depression of the latter by the pressure of the operator's finger will raise the stop 7 and release the clutch. When the clutch shaft 11 and cam 12 (by which latter the motion of the clutch shaft is communicated to the machine) have made one revolution, mechanism hereafter described comes into play and disconnects the clutch elements from each other, while the stop 7, previously restored to its normal position, again engages the clutch mechanism. The parts are thus restored to their initial positions, ready for another actuation of the key or plunger 6.

The clutch, in its preferred form, is illustrated in detail in Figs. 3 to 10 inclusive, and referring now thereto, 13 designates the clutch casing, circular in form, provided with a housing 14 into which extends the armature shaft 15 of the motor 4. The armature shaft carries a worm or endless screw 16, which meshes with a worm-gear 17 inside the clutch casing. The worm gear is rigidly fastened to a disk 18 which is rotatably mounted on the clutch shaft 11, arranged at right angles to the armature shaft 15; so that the motor can be continuously driven, and with it the worm gear and its carrying disk, without imparting motion to the clutch shaft until the latter is connected with the disk by the clutch elements now to be described. Rigidly mounted on the clutch shaft 11 is a double-arm lever 19, provided with a hub 20. Pivoted at their ends to the ends of the double-arm lever 19 are curved clutch members 21, 21, extending in opposite directions and terminating in engaging faces adapted to bear on the inner surface of a clutch flange 22 outstanding from the edge of the disk 18, so that when the clutch members are held in engagement with the flange the lever 19, and with it the clutch shaft 11, will revolve in unison with the worm gear 17, which, it will be remembered, is driven by the motor. At the side of the lever 19 opposite to the disk 18, is a second double-arm lever, 23, rigidly fastened on a hub 24 which in turn is loosely mounted on the clutch shaft 11 so that the lever 23 can oscillate relatively to the lever 19, which it crosses at a slight angle as shown. Extending from the laterally projecting oppositely disposed extensions or fingers on the arms of lever 23, to the clutch members 21, are two springs 25; and extending from the arms of lever 23 into slots in the clutch members 21 are two pins or studs 26. It will be seen that the tendency of the springs is to rotate the lever 23 on the shaft 11 in a counter-clock-wise direction (as viewed in Fig. 6) and, by reason of the inclination of the slots 26, to throw the clutch members outward against the flange 22. This action, however, is prevented when the clutch is inactive, by the hook or stop 7, previously mentioned engaging a shoulder on lever 23, and a stop or arm 27 pivoted on an extension 28 of one of the arms of lever 19. This stop or arm 27 is held by a spring 29, against a cam surface 30 on the removable portion 31 of the clutch casing 5 arranged at such an angle to the arm 27 that the resulting resistance to the tension of springs 25 will be too great for said springs to overcome. Thus the said springs are prevented from causing relative movement of the levers 19 and 23 when the arm 27 is in the position shown in Fig. 6 and the lever 23 is engaged by the stop 7; so that the clutch members are held out of engagement with the flange 22 when the levers 19 and 23 are in the positions shown in the figure just mentioned.

With the parts in the positions above described, it will be apparent that upon release of the lever 23, by the stop 7, actuated by the key 6 as previously explained, the clutch members 21 will be thrown outward by the springs 25 into engagement with the clutch flange 22, and at the same time the lever 23 will be partially rotated counter-clock-wise (as viewed in Fig. 6). The clutch members being thus brought into engagement with the rotating flange 22, they, and with them the levers 19 and 23 and clutch shaft 11, are revolved in the same direction, it being of course understood that in the present embodiment of the invention the rotation of motor shaft 15 (Figs. 3 and 4) is such as to revolve the worm gear 17 clockwise as viewed in Fig. 3, or counter-clockwise as viewed in Fig. 6.

The position of the parts just after the movement of the clutch shaft 11 has begun is shown in Fig. 7, in which it will be seen that as the arm 27 is carried away from the cam surface 30 it is thrown outward by its spring 29 against the inner surface of the removable part or cover 31 of the clutch casing. As the shaft 11 continues its movement the stop 7 is brought back into the path of the lever 23, by mechanism hereafter described, while the arm 27 (having an anti-friction roller 32 on its outer end) rides up on a spiral cam 33, formed inside the removable cover 31 and terminating at the cam surface 30. The positions of the parts near the end of the revolution of the shaft 11 is shown in Fig. 8, in which it will be seen that the arm 27 is approaching the cam surface 30 and the lever 23 is approaching engagement with stop 7. As the lever 23 strikes the stop it is arrested at once; but the shaft 11 continues in motion and with it the lever 19. This movement of the latter lever relative to the other draws the clutch members inward and out of engagement with the clutch flange 22, at the same time extending springs 25. By this time, however, the arm 27 has been carried off of cam 33, whereupon the spring 29 instantly throws the arm outward and into engagement with the cam surface 30. It will therefore be seen that the shaft 11 is positively brought to rest at the end of one complete revolution and that all the moving parts of the clutch mechanism are restored to their normal or initial positions shown in Figs. 3 and 6.

The devices by which the stop or hook 7 is returned to its initial position in the path of the shoulder on lever 23, are illustrated in Figs. 9 and 10, wherein it will be seen that the said stop is pivotally connected at its hooked end to a curved link 34, which rests on the flat inner surface of the cover-portion 31 and is pivoted to one end of an arm 35. The latter is pivoted at its other end on the cover 31 and is curved so that its swinging end will lie in the path of a stud 36 on the lever 23 when the stop 7 is raised to release the lever. As the lever 23 revolves the stud 36, which is on the same end of the lever as the shoulder with which the stop 7 engages, strikes the arm 35 and moves it outward, thereby drawing the link 34 downward and with it the stop 7 to the positions shown in Fig. 10. It will also be seen that the curvature of link 34 is such that the stud will not come in contact therewith as the lever 23 revolves.

Pivoted at one end to the side of the motor casing is a link 37, which at its other end is pivotally connected to a link 38 extending up into pivotal connection with an arm 39 on a rockshaft 40 extending transversely of the machine at the forward part thereof. Carried by links 37, 38, at the junction thereof, is a stud 41 bearing on the cam 12, which it will be remembered, is mounted on the clutch shaft 11 and hence rotates clockwise, as viewed in Fig. 1. The cam therefore draws down the link 38, rocking shaft 40 and with it an arm 42 connected by a rod 43 with a crank-disk 44 on the end of the main operating shaft of the machine.

In order to prevent depression of the button 6 while the clutch is in operation, or when the carriage, 45, is not in its forward position, mechanism is provided as follows. When the carriage is in its forward position, as in Fig. 1, it strikes the upper end of a vertical lever 46, thereby retracting the lower end of the same. This in turn retracts a link 47, pivoted to the lever 46 and draws back an arm 48 carrying at its upper end a stud 49. By the operation just described, the stud is carried under a notch 50 in the forward end of lever 10, thus permitting the button 6 to be depressed. When the carriage is pushed back, however, the lever 46 swings in the opposite direction, causing the stud 49 to be moved forwardly under the adjacent end of lever 10, so that the latter, if the attempt is made to depress the key or button 6, will strike the stud and hence be held against downward movement. Straddling the rod 43 is a two-arm lever 51, one arm of which has its lower end in the path of a pin 52 on the rod 43, while the other arm, lying directly behind the other as viewed in Fig. 1, has its lower end, indicated by the dotted line at 53, lying in position to engage the top of a projection 54 on link 9. These arms are normally held in their rearward position, as shown, by the pin 52; but when the rod 43 is drawn forward, of course carrying the pin with it, the arms of lever 51 swing forward thereby bringing the arm at the back over the projection 54 and locking the link against actuation by the button 6. When the rod 43 is returned to its initial position, as shown in Fig. 1, the link is unlocked. It will therefore be seen that the clutch cannot be thrown into operation unless the carriage is in its forward position (in operative relation to the printing devices, not shown), and that the clutch-controlling mechanism cannot be actuated by the operator so long as the clutch is in operation; in other words, the clutch, having once been set in operation, must complete its cycle and must become locked at the end thereof.

It is to be understood of course that the apparatus herein specifically described is merely the preferred embodiment of the invention, which may be embodied in other forms without departure from its proper scope as defined by the appended claims.

What I claim is:

1. In a clutch, the combination of a shaft, a clutch element loosely mounted on said shaft and constantly driven, clutching members operatively connected with the clutch shaft and adjustable into and out of engagement with the constantly driven element, a lever loosely mounted about the clutch shaft and capable of limited oscillation thereon, springs connecting the clutching members with the said lever and acting to throw the said members into engagement with the constantly driven element, a manually releasable stop for holding said lever stationary relatively to the constantly driven element, and automatic means for restoring said stop to position to reëngage the lever.

2. A clutch comprising in combination, a clutch element adapted to be constantly driven, a clutch shaft on which said element is rotatably mounted, clutching members connected to the clutch shaft to revolve therewith and capable of adjustment into and out of engagement with the said constantly driven clutch element, a lever loosely mounted on the clutch shaft, springs connecting the clutching members with said lever to throw the former into engagement with the constantly driven element, a stop normally holding the lever stationary and manually movable to release the lever, automatic means for retracting the stop to its engaging position, whereby the lever will be reëngaged by the stop and the clutching members retracted from engagement with the constantly driven element, and means operating simultaneously with the retraction of the clutching members to prevent reëngagement thereof with the constantly driven element while the said lever is held by the stop.

3. In a clutch, the combination of a shaft, a clutch element loosely mounted on said shaft and adapted to be driven constantly, a lever having a limited oscillation on said shaft, clutch members operatively connected with said shaft, guiding means and resilient connections between said lever and the clutching members arranged to throw said members into and out of connection with the constantly driven element, a manually releasable stop for holding said lever stationary relatively to the constantly driven element, and automatic means for restoring said stop to position to reëngage the lever.

4. A clutch comprising in combination, a clutch shaft, a clutch element rotatable thereon and adapted to be constantly driven, a double-arm lever rigidly mounted on the said shaft, oppositely disposed clutching members pivoted to the arms of said lever and movable into and out of engagement with said constantly driven element, a lever having limited oscillation mounted on said shaft and movable relatively to said clutching members, means urging said members into engagement with said element, guiding means between the oscillating lever and the clutch members, and manually controlled mechanism normally maintaining said clutch members disengaged from the constantly driven element.

5. A clutch comprising in combination, a clutch element adapted to be constantly driven, a shaft on which said element is rotatably mounted, a double-arm lever rigidly mounted on said shaft, oppositely disposed clutching elements pivoted to the arms of said lever, a double-arm lever loosely mounted on said shaft and connected with the said clutching members, springs between the clutching members and the loosely mounted lever, acting to throw the clutch members into engagement with the constantly driven element, manually controlled means for holding the loosely mounted lever stationary, and means connected with the rigidly mounted lever to hold the same and the clutch shaft against movement contrary to the normal direction of rotation, when the loosely mounted lever is held stationary.

6. In a clutch, the combination with a constantly driven element, and a shaft on which the same is rotatably mounted, of a double-arm lever rigidly mounted on said shaft, oppositely disposed clutching members each pivoted at one end to an arm of said lever whereby they may be shifted to bring their other ends into engagement with said constantly driven element, a double-arm lever loosely mounted on the shaft and provided with pins engaging the clutching members whereby movement of the levers relative to each other will throw the clutching members into or out of engagement with the constantly driven element according to the direction of such movement, and springs between the loosely mounted lever and the clutching members.

7. In a clutch, the combination with a constantly driven element, and a shaft on which the same is rotatably mounted, a double arm lever rigidly mounted on said shaft, oppositely disposed clutch members, each pivoted at one end to an arm of said lever whereby they may be shifted to bring their other ends into engagement with said constantly driven element, a double arm lever loosely mounted on the shaft and provided with pins engaging the clutching members whereby movement of the levers relative to each other will throw the clutch members into and out of engagement with the constantly driven element according to the direction of such movement, springs between the loosely mounted lever and the clutch mechanism, means connected with the rigidly mounted lever to hold the same and the clutch shaft against movement contrary to the normal direction of rotation, and a fixed cam for coöperating with said means.

8. In a clutch, the combination of a constantly driven element, a revoluble shaft on which the said element is rotatably mounted, clutching members mounted to revolve with said shaft and capable of movement into and out of engagement with the constantly driven element, a double-arm lever loosely mounted on the shaft, pin and slot connections between said lever and the clutching members whereby movement of the lever on the shaft will shift the clutching members into or out of engagement with the constantly driven element according to the direction of the lever's movement, and a manually movable stop for holding the said lever stationary.

9. In a clutch, the combination of a casing, a constantly driven element, a revoluble shaft on which said element is rotatably mounted, a double-arm lever rigidly mounted on the shaft, clutching members pivoted to the arms of said lever whereby said members may be thrown into and out of engagement with the constantly driven element, a second double-arm lever loosely mounted on the shaft and connected with the clutching members whereby relative movement between the levers will throw the clutching members into or out of engagement with the constantly driven element, an arm connected to one of the arms of the first lever and adapted to bear against a fixed part of the casing, and a manually movable stop arranged to hold the second lever stationary.

10. In a clutch, the combination of a constantly driven element, clutching members adapted to be shifted into and out of engagement with the driven element, an oscillating element revolving with said clutching members, cam connections between the oscillating element and the clutch members for shifting said members, a stop normally in position to engage said revolving element to hold the same stationary and movable to release the same, and mechanism actuated by said revolving element to restore the stop to its normal position.

AUGUST KNISTROM.

Witnesses:
FRED L. LEE,
EUGENE P. CLOUDMAN.

Copies of this patent may be obtained for five cents each, by addressing the "Commissioner of Patents, Washington, D. C."